March 16, 1926.
H. A. HOUSTON ET AL
1,576,762
GUIDING TRUCK
Filed Nov. 1, 1922
3 Sheets-Sheet 3
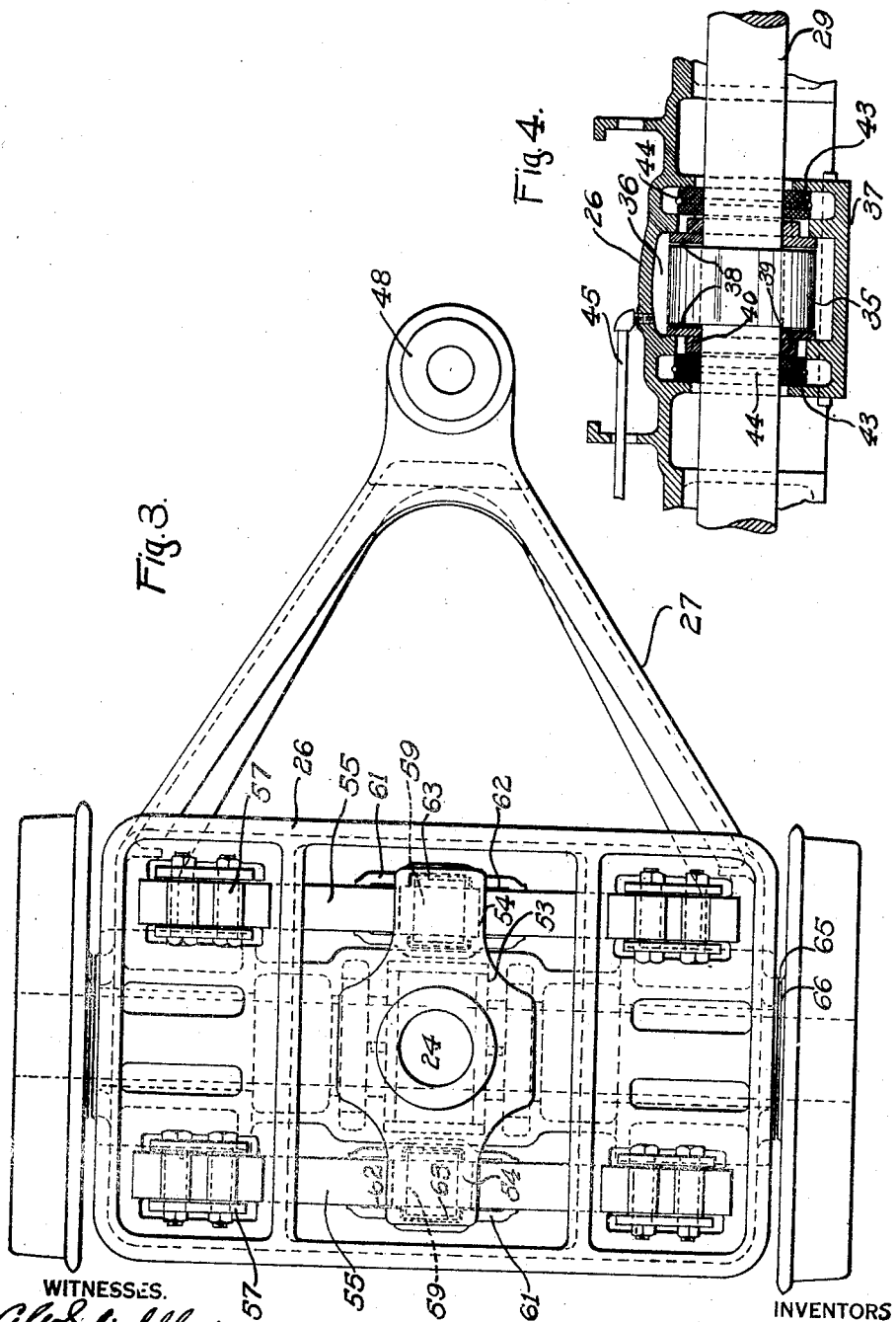
WITNESSES.
INVENTORS
Harold A. Houston and
Frank L. Alben.
BY
ATTORNEY Patented Mar. 16, 1926.

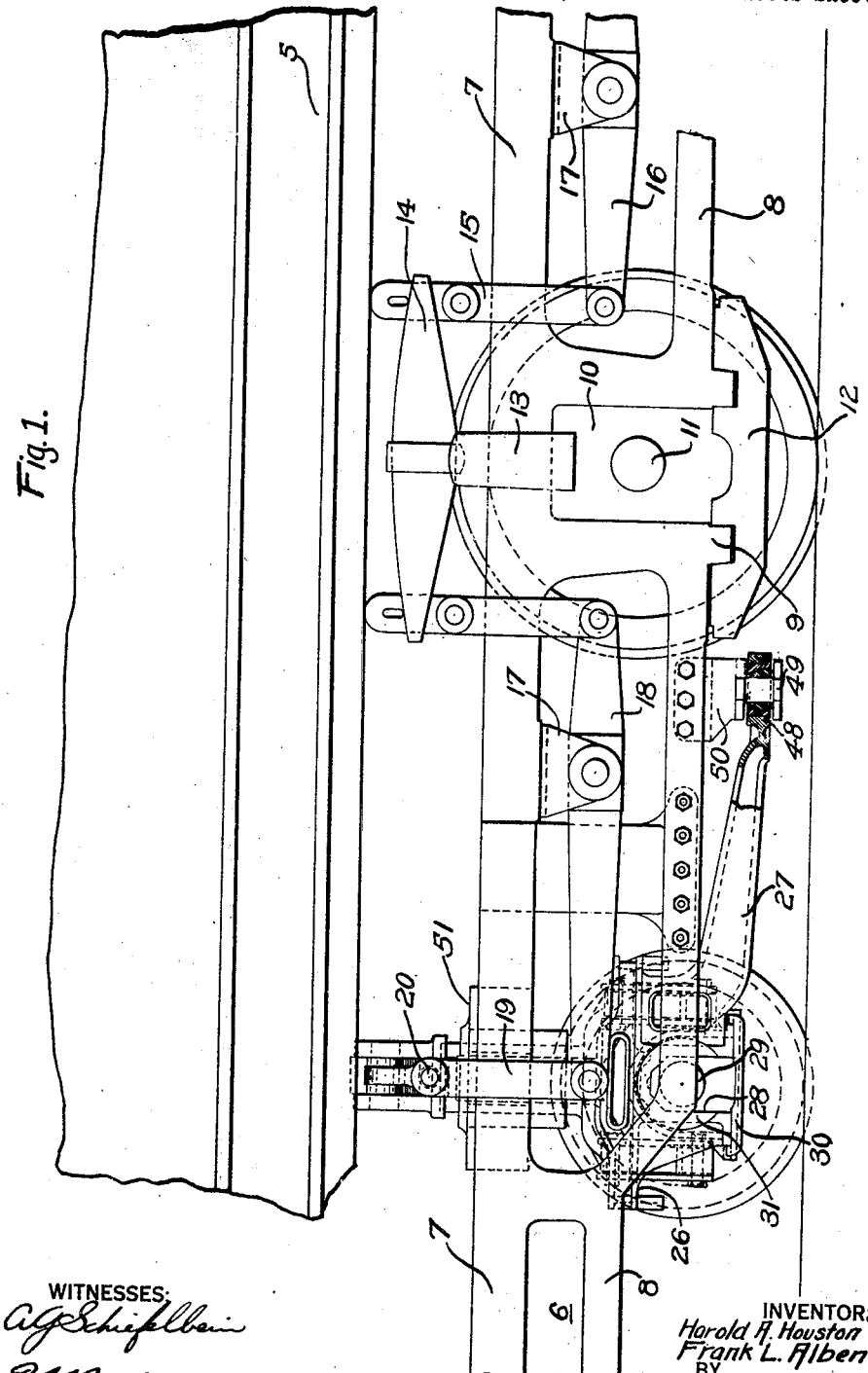

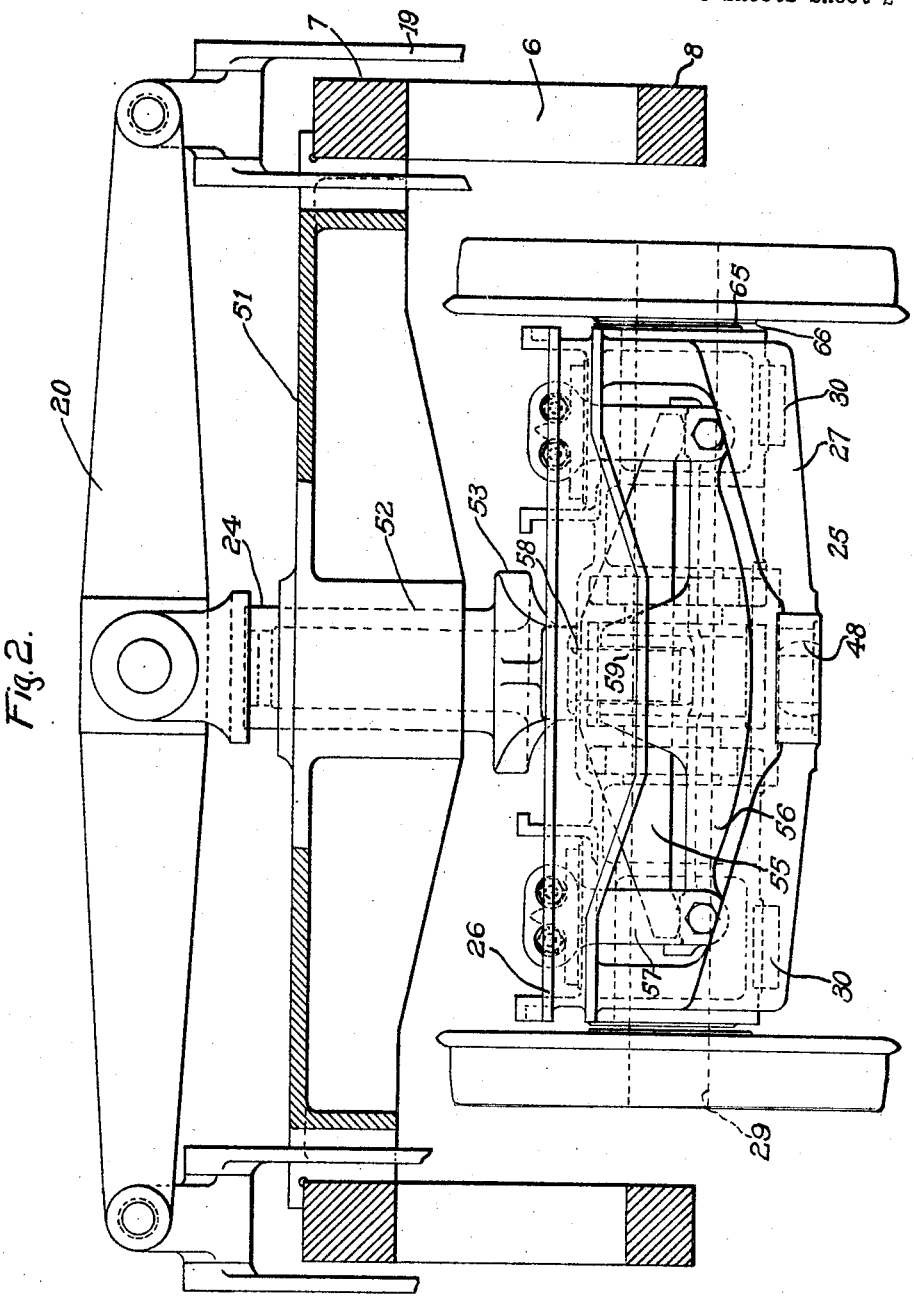

1,576,762

UNITED STATES PATENT OFFICE.

HAROLD A. HOUSTON AND FRANK L. ALBEN, OF WILKINSBURG, PENNSYLVANIA, ASSIGNORS TO WESTINGHOUSE ELECTRIC AND MANUFACTURING COMPANY, A CORPORATION OF PENNSYLVANIA.

GUIDING TRUCK.

Application filed November 1, 1922. Serial No. 598,308.

*To all whom it may concern:*

Be it known that we, HAROLD A. HOUSTON, a citizen of the United States and a resident of Wilkinsburg, in the county of Allegheny and State of Pennsylvania, and FRANK L. ALBEN, a citizen of the United States and a resident of Wilkinsburg, in the county of Allegheny and State of Pennsylvania, have invented a new and useful Improvement in Guiding Trucks, of which the following is a specification.

Our invention relates to radial or guiding trucks for electric locomotives of the type employed to effect the guiding and centering of the main trucks relative to the locomotive cab or body.

It is among the objects of our invention to provide a radial or guiding truck for railway vehicles which shall be of improved mechanical construction, which shall be of a design that greatly simplifies the manufacture and reduces the cost of construction and which shall be efficient in performing the guiding and centering of the cab and main trucks.

It is a further object of our invention to provide a truck of such design as to eliminate the successive wearing and straining of parts, as encountered in radial trucks heretofore employed.

Radial trucks are employed on railway vehicles to provide steering for the main trucks having long wheel bases and to guide the swivel or rigid trucks so that they will more readily follow the curvature of the rail for the purpose of reducing flange wear on the wheels and rails and to prevent failure of the wheel centers, axles and truck frames.

Our present invention is directed to a guiding truck embodying steering and guiding features which avoid the difficulties encountered in prior structures and are so designed as to function efficiently under all operating conditions.

In the accompanying drawings, constituting a part hereof and in which like reference characters designate like parts, Figure 1 is a side elevational view of a portion of a railway-vehicle truck, showing a portion of the cab or body mounted thereon and having a radial truck embodying the principles of our invention secured thereto;

Fig. 2 is a rear elevational view, partially in cross-section, of the radial truck and a portion of the main truck frame;

Fig. 3 is a plan view of the radial truck shown in Figs. 1 and 2; and

Fig. 4 is a cross-sectional view, partially in elevation, of the wheel axle and the axle housing.

Referring to Fig. 1, the railway vehicle illustrated comprises a cab or locomotive body 5 supported on one or more swivel trucks 6, which comprise the usual reinforced side frame construction consisting of parallel upper and lower rails 7 and 8 respectively. The side frames are provided with the usual pedestal jaws 9 adapted to receive the journal boxes 10, in which the axles 11 are rotatably mounted. The journal boxes 10 are held in position by pedestal binders 12 and are provided with stirrups 13 on which springs 14 are mounted. The springs 14 are inter-connected by spring links 15 and equalizer beams 16 that are pivotally mounted on the side frame by brackets 17 to provide equal load distribution on the driving axles 11. One end of the front spring 14 is connected to an equalizer beam 18 having a pivotal connection, by a link 19, to a cross equalizer beam 20 which is secured to a center pin 24 of a radial truck 25.

The radial truck 25 comprises an integral frame body portion 26 having a radius bar 27 and the upper part of a journal 28 formed integrally therewith. An axle 29 is journaled in the body frame 26 and is provided with the usual grease cellar and bearing brasses (not shown), the latter being retained in position by pedestal binders 30 to prevent spreading of the pedestal jaws 31.

Referring to Fig. 4, the axle 29 is provided with a thrust bearing 35 which consists of an enlarged body portion of the axle and may form an integral part thereof. The thrust bearing is located in a portion of the truck frame 26 that is enlarged to form a chamber 36 having an opening at its lower portion which is provided with a dust-proof and oil-proof cover 37. The thrust collar 35 is provided with a plurality of bearing surfaces 38 which are in co-operative engagement with a plurality of bearing collars 39 secured by a groove-and-tongue connection 40 to the frame 26 to prevent rotative movement thereof.

The bearing collars 39 constitute thrust members which receive the thrust of the axle and are accessible through the cover 37 for renewal when worn. The backs of the collars 39 are provided with suitable packing rings 43 which are secured to the axle 29 by steel-wire bands or other means 44 to hold them in position and to prevent the escape of the lubricant which is contained in the chamber 36. The lubricating chamber 36 is connected, by a pipe line 45, to a suitable source of lubrication, such as a reservoir (not shown), which provides constant lubrication for the thrust bearing.

The radius bar 27 is connected, at one end, by a pivot ball joint 48 to a shoulder pin 49 on a cross-tie 50 that is attached to the side frames 6, thus providing pivotal and vertical movement for the radial truck 25, which is further connected by the center pin 24 to a cross-tie 51 of the main truck frame. The center bearing 24 is movably secured in a swivel bearing 52 and is provided with an enlarged body portion 53 (Figs. 2 and 3), longitudinally-extending ends 54 that are supported by a pair of leaf springs 55 mounted on cross ties or spring planks 56, which are pivotally connected to a plurality of heart cam links 57, suspended from the truck main frame 26.

The center bearing is provided with recesses 58 to receive the spring shackles 59 which are further engaged by vertically extending jaws 61 of the swinging cross ties or spring planks 56. The jaws 61 are provided with clearance spaces 62 to permit freedom of movement of the spring member therein, and a bearing shoe 63, of suitable metal or alloy, such as manganese steel, is disposed within the clearance space to prevent wear. A suitable clearance space 65 is provided between the wheel hub 66 and the truck frame to prevent the wear and abrasion caused by grit and dirt accumulating therein, as is encountered in structures of the usual type. There is no bearing contact between the wheel and the truck frame, as the thrust is carried by the thrust bearing illustrated in Fig. 4.

An equalizer system of the type herein described permits of a one-point bearing which is theoretically located near the center of the main driving truck, and the cross equalization is effective in equally distributing the load on the side frames of the trucks and thence to the respective drivers.

The cross-equalizer center-pin support causes a considerable concentration of weight on the springs 55 of the radial truck which is effective in transferring the weight from the side frames of the main truck when traversing curves and irregularities in the rails. The thrust received at the side frames 6 of the main trucks is transmitted, through the cross tie 51, to the center bearing 24, thence through the spring shackles 59 to the link-suspended cross ties 56, thus eliminating the lateral pressure against the spring band or shackle 59, as was common in prior structures.

It will be readily understood, from the above description of our invention that radial trucks formed in accordance therewith provide a mechanically durable and efficient centering and guiding truck adapted to railway vehicles. The method of carrying the thrust between the wheel axle and the truck frame and the transmission of the thrust through the center pin and swinging cross-tie construction are entirely novel and the method of supporting the semi-elliptical springs upon which the center pin 24 is supported so as to eliminate lateral thrust therethrough clearly distinguishes from spring mountings employed in prior structures.

Although we have described a specific embodiment of our invention, it will be obvious to those skilled in the art that various modifications may be made in the details of construction. For instance, the thrust bearing on the wheel axle may be located on any portion thereof and distributed so as to provide several bearing surfaces at various portions of the shaft, the structure herein employed being for the purpose of obtaining efficient lubrication. The center-pin support may be of the swinging link or compression-cam type, and the general features of the truck and frame construction may be altered to suit specific operating conditions. These and other changes may be made without departing from the principles herein set forth.

We claim as our invention:—

1. The combination with a locomotive cab and trucks for carrying the cab, of a radial truck having lateral restraining means between its frame and the axle thereof, said means comprising a thrust bearing located on the axle in engagement with co-operating bearing plates provided in said frame.

2. The combination with a locomotive cab and trucks for carrying the cab, of a radial truck having lateral restraining means between its frame and the axle thereof, said means comprising a plurality of thrust bearing surfaces located on the axle co-operating with bearing rings secured from rotative movement in the axle housing of the truck.

3. The combination with a locomotive cab and trucks for carrying the cab, of a radial truck having lateral restraining means between its frame and the axle thereof, said means comprising a thrust bearing centrally located on the axle in engagement with co-operating bearing plates provided in a recessed portion of the truck axle housing, said bearing plates being secured in the housing to prevent rotative movement therebetween and said recessed portion having a cover to provide an enclosed lubricating chamber.

4. The combination with a locomotive cab and trucks for carrying the cab, of a radial truck comprising an integral wheel frame and radius-bar construction, a center-pin connection between the radial truck and main truck frame, and a pivotal-ball connection between the radius bar and main truck frame.

5. The combination with a locomotive cab and trucks for carrying the cab of a radial truck comprising an integral wheel frame and radius-bar construction, a center-pin connection between the radial truck and main truck frame, and a pivotal-ball connection between the radius bar and main truck frame, said center-pin connection comprising a vertically disposed pin supporting a cross-equalizer beam extending through a swivel bearing provided in a cross tie of the main truck frame and having a flanged body portion supported upon a plurality of springs mounted on link-supported crossties on said radial truck.

6. The combination with a locomotive cab and trucks for carrying the cab of a radial truck comprising an integral wheel frame and radius-bar construction, a center-pin connection between the radial truck and main truck frame and a pivotal-ball connection between the radius bar and main truck frame, said center-pin connection comprising a vertically disposed pin supporting a cross-equalizer beam extending through a swivel bearing provided in a cross tie of the main truck frame and having a flanged body portion supported upon a plurality of springs mounted on link-supported crossties on said radial truck, said link-supported cross ties being adapted to transmit lateral thrust from the center pin to the truck body.

7. The combination with a locomotive cab and trucks for carrying the cab of a radial truck comprising an integral wheel frame and radius-bar construction having the top of the journal formed integral therewith and having a self-lubricating thrust bearing on the axle thereof.

In testimony whereof, we have hereunto subscribed our names this 24th day of October, 1922.

HAROLD A. HOUSTON.
FRANK L. ALBEN.